United States Patent [15] 3,671,453
Triggiani et al. [45] June 20, 1972

[54] PROCESS FOR PREPARING MULTI-COMPONENT NUCLEAR FUELS

[72] Inventors: Leonard V. Triggiani, Rockville; Moises G. Sanchez, Severna Park, both of Md.

[73] Assignee: W. R. Grace & Co., New York, N.Y.

[22] Filed: Sept. 24, 1969

[21] Appl. No.: 860,814

Related U.S. Application Data

[63] Continuation-in-part of Ser. No. 670,394, Sept. 25, 1967, Pat. No. 3,514,412.

[52] U.S. Cl. ................252/301.1 S, 23/347, 23/349, 176/68
[51] Int. Cl. .................................................C09k 3/00
[58] Field of Search ..................23/345, 346, 347, 349; 252/301.1; 264/0.5

[56] References Cited

UNITED STATES PATENTS

| | | |
|---|---|---|
| 3,171,715 | 3/1965 | Kleinsteuber..................23/345 X |
| 3,171,815 | 3/1965 | Kelly et al.....................252/301.1 |
| 3,320,177 | 5/1967 | Halva............................252/301.1 |
| 3,320,178 | 5/1967 | Dewell..........................252/301.1 |
| 3,334,974 | 8/1967 | Fletcher et al................23/344 |
| 3,518,328 | 6/1970 | Triggiani......................264/0.5 |

Primary Examiner—Carl D. Quarforth
Assistant Examiner—R. L. Tate
Attorney—Joseph P. Nigon and Kenneth E. Prince

[57] ABSTRACT

A process for preparing particles, powders, spheres, and other shapes of uranium carbide or uranium nitride and/or thorium carbide or thorium nitride containing significant amounts of a second fissionable component. The particles are prepared by impregnating a matrix with a sol or other suitable dispersion of the fissionable component.

10 Claims, No Drawings

PROCESS FOR PREPARING MULTI-COMPONENT NUCLEAR FUELS

This application is a continuation-in-part of application serial number 670,394, filed Sept. 25, 1967, now U.S. Pat. No. 3,514,412.

The preparation of fuel elements from sols has resulted in products that have very desirable physical properties. The products can be sintered to very high density at much lower temperatures than was possible when the fuel elements were prepared by conventional ceramic techniques. Microspheres prepared from sols may range in size from a few microns up to 1,000 microns or more and provide a very convenient method of handling nuclear fuels.

There has been demand for fuel elements of binary and multi-component structure containing more than one material. Plutonia-urania fuels, for example, are in demand as are the thoria and urania fuels containing fissionable materials such as U-235 or U-233.

In the prior art processes, these compositions have been prepared by co-precipitation from solutions of salts of the respective metals or by physical mixing of the dried oxide particles followed by comminution, pressing, etc., by means of conventional ceramic techniques. They have also been prepared from mixed oxide sols in a process wherein a solution or sol of the second component is added to a sol of the first component.

The differences in the level of the radio-toxicity of the fertile matrix component and the fissionable second component increases the problems in preparing mixed oxide sol products by these conventional techniques. Urania (U-238) can be handled safely with conventional laboratory equipment. Plutonium, on the other hand, can only be handled in glove boxes and other sophisticated equipment. The handling problems are multiplied several fold when the mixed oxide fuel preparation is scaled up for plant production.

We have developed a process for preparing these mixed fuel systems in which the two components are handled separately in equipment designed to handle each component. This system is a substantial improvement over the conventional processing in which both components are processed together in each of the steps, so that the most sophisticated equipment is necessary for each step and for the entire quantity of material being processed.

In our novel process, we impregnated porous matrix particles with carbide or nitride precursors of the fissionable component. This may be accomplished by impregnating the spheres with sols or solutions of a salt of the desired fissionable component followed by conversion to the carbide or nitride in the pores of the matrix.

The particles may be subjected to various degrees of drying. The spheres may properly be termed gels in microspheroidal form. The term "gel" is thus applicable to describe our matrix materials.

Our process fills a long standing need for means of preparing a mixed carbide or nitride fuel wherein a fissionable component is isolated to only a few processing steps, so that the greatest amount of work can be done in conventional equipment. This system also avoids the problem of contamination of the equipment with the fissionable materials prior to the final step of the process.

For purposes of simplicity, our process will be described as our preferred microsphere impregnation process. However, it is obvious that our process can be used for preparing nuclear fuel particles in any desired shape or physical form.

In our preferred process, we prepare the fertile matrix microspheres (thoria or urania mixed with carbon) and add the desired amount of the fissionable component as a solution of a salt or as a sol of the component. The impregnated microspheres are then washed, dried, and calcined to prepare the final product. The nitride is prepared by calcining a urania plus carbon, thoria plus carbon or thoria-urania plus carbon mixture in an argon atmosphere followed by calcination in a nitrogen atmosphere under conditions suitable for conversion to the nitride. The fissionable component is normally added as a solution of a salt or a sol of the fertile microspheres prior to the calcination steps.

Broadly speaking, our preferred carbide process comprises the following steps:

1. Selection and dissolution of the fuel raw materials.
2. Addition of a suitable quantity of carbon to convert the fertile and fissionable components to the carbides.
3. Preparation of sols or suitably modified solutions of these materials.
4. Formation of microspheres from the carbon containing sols or the suitably modified carbon containing solutions.
5. Addition of a fissionable additive into the microsphere product.
6. Sintering the carbon containing microspheres to effect conversion to the carbide.

Our preferred nitride preparation process comprises the following steps:

1. Selection and dissolution of the fuel raw materials.
2. Preparation of sols or suitable modified solutions of these materials.
3. Addition of a sufficient quantity of carbon to convert the fissionable and fertile materials to the carbide.
4. Formation of microspheres from the carbon containing sols or the suitable modified carbon containing solutions.
5. Addition of the fissionable additive into the microsphere product.
6. Calcination of the carbon containing microspheres in an argon atmosphere to form the carbide.
7. Conversion of the carbide to the nitride by calcination in a nitrogen atmosphere.

In the first step of our process, the fertile base material and the fissionable materials are selected. The fertile matrix materials are naturally occuring or depleted urania (U-238) mixed with carbon above or in admixture with other materials such as thoria, for example, Thoria (Th-232) mixed with carbon may also be used as a fertile matrix material.

The fissionable second component of the microspheres may be uranium or plutonium, for example. Urania (U-238) mixed with carbon, for example, may be impregnated with plutonium or the other fissionable isotopes U-233 or U-235. A mixed thorium-uranium carbide fuel may be prepared by impregnating thoria mixed with carbon ($ThO_2$-C) microspheres with U-233 or N-235.

The fertile matrix material, urania or thoria, is first obtained as a solution of nitrate, chloride, etc. The solution is then converted to the sol form and mixed with carbon. Suitable sols may be prepared by any of several methods. The preferred techniques for sol formation are:

1. Electrodialysis using anion permeable membranes.
2. Controlled hydrolysis with urea.
3. Ion exchange using resin in the hydroxide form.
4. Peptization of washed hydroxides with an acid.
5. Electrolysis of solutions, with oxidation of the anions to a volatile component.

In the next step of our process, the sols are converted to microspheres. The method of preparing these microspheres is not part of this invention. It is described in U.S. Pat. No. 3,331,785. Briefly, the process comprises forming the sols into droplets and drying the droplets in a column of solvent passed in countercurrent direction to the sol particles. The formed microspheres are removed from the bottom of the column and washed.

The matrix material may also be prepared as a powder or as microspheres or as larger sized spheroids in a process in which a solution of a salt of the matrix material is admixed with a water soluble resin that increases in viscosity in an alkaline medium. The droplets of solution are then fed into an aqueous alkaline solution to form microspheres or spheroids. The particles or spheroids are recovered, washed, and dried.

The microspheres or particles may also be prepared by any of the other processes described in the technical and patent literature, provided that the final product has sufficient porosity to retain the desired amount of the fissionable component.

In our process, we believe that the thoria-carbon and urania-carbon microspheres when contacted with the solution or sol containing the fissionable component accommodates the fissionable component solution within the voids of the microspheres. The solution may then by converted to an insoluble form, dried and sintered to form the carbide or nitride product.

The solution or sol of the fissionable material used to impregnate the microspheres may be prepared in an inorganic or organic solvent. An aqueous solution of the salt is preferred, since it is thereby possible to achieve a higher concentration of fissionable solution. The preferred salt is the nitrate; however, the chloride, sulfate, etc., can also be used in the preparation of the impregnation solution. The impregnation solution of fissionable material is prepared in concentrations of about 0.1 to 700 grams per liter. When an organic solvent is used, the preferred solvent is acetone. Other suitable solvents include diethyl ether, dibutyl ether, methylisobutylketone, tributylphosphate, trioctylamine, trilaurylamine, cyclohexyldilaurylamine, certain alcohols, etc.

When the fertile base microspheres are composed of urania, admixed with carbon, they may be hyperstoichiometric in oxygen at this stage, due to the presence of hexavalent uranium. Hexavalent uranium is more soluble in aqueous media then quadrivalent uranium. In that case, the microspheres must be reduced to the dioxide if the product is to be free of interparticle sludge, etc. and to insure proper interaction of the impregnant and urania substrate. This reduction can by carried out using any suitable technique, such as hydrogen reduction, etc. However, this step can by omitted if a non-aqueous solvent is used to prepare the impregnant. The hydrogen treatment is normally carried out at a temperature of 300°–900°C. for about 1 hour to 10 hours. In our process, this step may be completed at low temperatures without destruction of the microsphere structure or porosity.

In one acceptable technique, the spheres were impregnated by slowly adding a solution of the fissionable salt or the sol to the microspheres while they are being agitated. When the fertile matrix material is urania-carbon, a portion of the agitation is preferably provided by a flow of argon or other inert gas that prevents the oxidation of urania to the hexavalent state. Any suitable inert gas, such as helium, argon, neon, nitrogen, etc., may be used. In the laboratory, it is convenient to agitate the microspheres by regulating the flow of gas in the area surrounding the microspheres. Other mechanical techniques for agitation may be used, such as stirring, shaking, etc. Agitation ing the microspheres in an aqueous ammonia solution. We prefer concentrated aqueous ammonia. However, concentrations of ammonia between 5 and 30 weight percent may be used. Gaseous $NH_3$ has also been used for this purpose. Generally, the precipitation is complete in about 10 minutes. However, shorter or longer times may be dictated by the type of operation and equipment being used.

The microspheres are then washed in deionized water to remove excess ammonia, anions, hexanol or other solvent. Generally about 250 cc. of deionized water per gram microspheres is sufficient to remove all impurities. The microspheres are then vacuum dried.

The sintering step is the final step of our process. Sintering is preferably carried out in a hydrogen-nitrogen atmosphere by heating at 300°–700°C. for about 0.5 to 7 hours, followed by sintering for another 0.5 to 6 hours at 1,000°C. to 1,800°C.

The matrix particles may, of course, be separated according to size by screening or other technique and only those particles falling in a given size range impregnated with the fissionable materials.

Our invention is further illustrated by the following specific but non-limiting examples.

EXAMPLE 1

This example illustrates a suitable method of preparing urania-carbon microspheres for use as a fertile base.

A uranous chloride solution containing 7.7 weight percent uranium having a density of 1.14 grams per cc. was prepared from a uranic oxychloride ($UO_2Cl_2$) solution by reduction with uranium metal. A total of 500 cc. of this solution was added with vigorous agitation to an alkaline dispersion of carbon. The carbon dispersion was a commercially available product containing 22 weight percent carbon. A total of 43.5 grams of the commercial carbon dispersion was diluted with 400 ml. of water before addition of the uranous chloride solution and a total of 250 cc. of concentrated ammonium hydroxide solution was added over a period of 1 hour. At the end of this time, a dark precipitate had collected in the bottom of the reaction vessel. The precipitate was then washed with dilute aqueous ammonia and water and slurried in a small amount of water. Nitric acid was added to a pH of 3.4 and the slurry was peptized 1½ hours at 100°C. The resulting sol was urania coated carbon spheres having a theoretical C/U ratio of 5.57. The final pH of the sol was corrected to a value of 3.8 by addi- In this run, a 1 gram sample of urania-carbon microspheres was pretreated by heating the urania-carbon microspheres to a temperature of 500°C. for 3 hours in hydrogen. This step removed any excess oxygen and converted the urania to stoichiometric $UO_2$.

A 1 gram sample of these microspheres was placed in a fritted disc filtration funnel in a glove box. A flow of argon was maintained through the funnel to blanket the spheres in an argon atmosphere during the impregnation step. A stock plutonium solution about 6 molar in nitric acid was prepared containing 60 grams of plutonium per liter. 2 ml. of this stock solution was diluted with 2 ml. of deionized water to prepare the impregnation solution. This solution was added dropwise to the microspheres. The microspheres were constantly agitated during the addition. Agitation was provided by a flow of argon through the filtration funnel. A total of about 0.8 cc. of solution was added by a medicine dropper to bring the spheres to incipient wetness.

The spheres were then washed with approximately 30 cc. of dry hexanol to remove water. The hexanol was removed very gently by vacuum filtration so as not to damage the impregnated microspheres.

The sample was then ammoniated by contacting with about 90 cc. of concentrated ammonia. The contact time was 15 minutes. The ammonia was then removed very gently by vacuum filtration. No precipitate was observed in the ammonia filtrate. The spheres at this point were whole with no precipitate on the surfaces. The impregnated microspheres were then washed with deionized water for 4 hours during which time no physical change in the microspheres was observed.

The spheres were dried using conventional techniques and after drying were treated in hydrogen with 1 hour required to reach 500°C. This temperature was maintained for 3 hours. The furnace was evacuated and the temperature raised over a period of ½ hour to 1,150°C. and held for 3 hours. At the end of 3 hours, the pressure was $5 \times 10^{-5}$ millimeters of mercury. The temperature was raised over a period of 15 minutes to 1,350°C. at a rate such that the pressure did not exceed $5 \times 10^{-4}$ millimeters of mercury. The temperature was then raised to 1,400°C. and held for 1 hour to achieve a pressure of $7 \times 10^{-6}$ millimeters of mercury. The final temperature, 1,750°C., was achieved very rapidly and held for 3 hours. The ultimate vacuum achieved was in the $10^{-7}$ millimeter range.

The product had a density of 11.2. This compares with a theoretical density of pure UC of 13.63 and pure $UC_2$ of 11.68. Analysis by X-ray of the product microspheres showed a mole ratio of $UC_2$ to UC to be 52 to 48. The total carbon content of the sintered spheres was 7.28 weight percent.

EXAMPLE 3

This example illustrates the method of converting the impregnated urania-carbon microspheres to the nitride.

Approximately 50 grams of impregnated uranium oxide-carbon microspheres, prepared by the general technique described in example 1, having a carbon to uranium molar ratio of 2.37 were transferred to graphite crucible. The crucible was inserted in a ceramic tube between the silicon-carbide heating elements of a Burrell furnace. Hydrogen gas flow was started through the furnace. The temperature increased to 500°C. over a period of 1 hour. The temperature was maintained at 500°C. for 3 hours. The gas feed was changed to argon. The temperature was increased to 1,500°C. over a 3½ hour period. The gas feed was changed to argon and nitrogen sweep continued at a temperature of 1,400°C. for a period of 7 hours. The temperature was again increased to 1,500°C. for an additional period of 7 hour. The product was removed, analyzed, and found to contain 0.69 percent free carbon and 580 parts per million of oxygen.

An effort was made to increase the theoretical density and decrease the oxygen content to the impregnated UN product. The product was transferred to a commercially available high temperature furnace equipped with means for sweeping gas to the furnace. A sample was brought to a temperature of 1,700°C. in an argon atmosphere and held there for about 24 hours. The furnace was then cooled to room temperature and the product analyzed. The product was found to contain 410 parts per million in oxygen and have a density on the order of 90 percent of theoretical.

EXAMPLE 4

When plutonium is precipitated in the pores of a gel substrate, the skeletal thickness may be thought of as a fertile matrix barrier separating the plutonium precipitated into the pores. On sintering, the plutonium will diffuse through the skeletal wall. We may therefore conclude that, on an average, about one-half of the skeletal wall thickness will represent the maximum diffusion path necessary for the plutonium (or other fissionable component) and the fertile matrix material to achieve homogeneous solid solution.

It is quite clear that gel material having thin skeletons are desirable as impregnation substrates. A series of calculations were made to define these properties of our matrices.

The surface area and pore volumes of a series of thoria sol residues prepared by the electrodialysis technique were measured. In this series, the surface areas varied from 85 square meters per gram to 127 square meters per gram; the pore volumes from 0.11 to 0.13 cc. per gram.

Using these figures and taking the density of thoria at 10 grams per cubic centimeter, we are able to calculate the specific skeletal volume, that is the volume occupied by the metal oxide comprising the particle framework. We find this value is 0.10 cc. per gram.

The pore volume is equal to the void space per gram. The specific volume is then equal to:

pore volume plus skeletal volume, or in this case (where the pore volume equals 0.13) to 0.23.

The porosity can be calculated using the formula:

$$\text{Porosity} = \frac{\text{Pore volume (cc./per gram)}}{\text{Total volume (cc./per gram)}}$$

Using the data collected from sols prepared by electrodialysis, we find that, in this case, our microspheres have porosities of: 41 to 57 percent.

The skeletal thickness ($\theta$) can be calculated, the formulas vary depending on the model used. The cylinder is an often accepted model. The volume ($V$) of a cylinder can be calculated from the formula:

$$V = \pi r^2 \, 1$$

The surface area (S.A.) can be calculated using the formula:

$$S.A. = 2\pi r \, 1$$

The skeletal thickness ($\theta$) is thus:

$$\frac{\theta}{2} = \frac{\text{Volume}}{\text{Surface area}}$$

Using the surface area and pore volume data referred to above, we found our matrix materials have a skeletal thickness ($\theta$) of from 7.9 to 118 A.

A basic characteristic of our materials is a combination of surface area and pore volume which will minimize the diffusion paths of less than 500 A are required for homogeneous solid solution formation. Of course, the shorter the diffusion path, the easier the attainment of solid solution. In our process, we prefer to use materials with diffusion paths of less than 500 A., preferably less than 100 A.

Our fertile base materials can thus be characterized as having:

Porosities of 10 to 80 percent:

An average diffusion path of less than 500 A., preferably less than 100 A.

A fissionable material content of 1 to 25 weight percent.

What is claimed is:

1. A process for preparing a mixed carbide nuclear fuel comprising a fertile matrix selected from the group consisting of uranium 238 carbide, thorium 232 carbide and mixtures thereof and a fissionable component selected from the group consisting of plutonium 239 carbide, uranium 233 carbide and uranium 235 carbide and mixtures thereof which comprises:
  a. mixing carbon with a material selected from the group consisting of urania 238 sols, thoria 232 sols thoria 232-urania 238 sols, solutions of uranium 238 compounds, solutions of thorium 232 compounds and solutions of thoria 232-urania 238 compounds,
  b. drying said sols or solutions and forming urania 238-C, thoria 232-C, or thoria 232-urania 238-C gel particles,
  c. contacting said particles with a fluid containing a compound of fissionable material selected from the group consisting of plutonium 239, uranium 233 and uranium 235,
  d. calcining said particles under vacuum or in an inert atmosphere at a temperature of about 1,000° to 1,900°C. for about 3 to 30 hours, and
  e. recovering the mixed carbide nuclear fuel particles as a product.

2. The process according to claim 1 wherein the impregnated particles contain from about 1 to 30 percent fissionable material.

3. The process according to claim 1 wherein the amount of carbon mixed with the urania sol or solution is about 20 percent in excess of the stoichiometric amount required to form the dicarbide, and the impregnated particles are calcined at a temperature of about 1,150 to 1,450°C. for about 4 to 6 hours, followed by heating to about 1,850°C. for 3 to 4 hours to densify the particles.

4. The process according to claim 1 wherein the urania 238 particles are heated in hydrogen or other reducing atmosphere at a temperature of about 400°–700°C. for a period of about 0.5 to 3 hours.

5. A process for preparing a mixed nitride, nuclear fuel comprising a fertile matrix selected from the group consisting of uranium 238 nitride, thorium 232 nitride and mixtures thereof and a fissionable component selected from the group consisting of plutonium 239 nitride, uranium 233 nitride and uranium 235 nitride and mixtures thereof, which comprises:
  a. mixing carbon with a material selected from the group consisting of urania 238 sols, thoria 232 sols thoria 232-urania 238 sols, solutions of uranium 238 compounds, solutions of thorium 232 compounds and solutions of thoria 232-urania 238 compounds,
  b. drying said sols or solutions and forming urania 238-C, thoria 232-C, or thoria 232-urania 238-C gel particles,
  c. contacting said particles with a fluid containing a compound of a fissionable material selected from the group consisting of plutonium 239, uranium 233 and uranium 235,
  d. calcining said particles in a nitrogen atmosphere at a temperature of 1,000° to 1,900°C. for about 0.5 to 10 hours, and
  e. recovering the mixed nitride nuclear fuel product.

6. A process for preparing a mixed nitride, nuclear fuel comprising a fertile matrix selected from the group consisting of uranium 238 nitride, thorium 232 nitride and mixtures thereof and a fissionable component selected from the group consisting of plutonium 239 nitride, uranium 233 nitride and uranium 235 nitride and mixtures thereof, which comprises:
  a. mixing carbon with a material selected from the group consisting of urania 238 sols, thoria 232 sols thoria 232-urania 238 sols, solutions of uranium 238 compounds, solutions of thorium 232 compounds and solutions of thoria 232-urania 238 compounds,
  b. drying said sols or solutions and forming urania 238-C, thoria 232-C, or thoria 232-urania 238-C gel particles,
  c. contacting said particles with a fluid containing a compound of a fissionable material, selected from the group consisting of plutonium 239, uranium 233 and uranium 235,
  d. calcining in an argon atmosphere at a temperature of about 1,000° to 1,900°C. for about 3.5 to 30 hours, followed by
  e. calcining in a nitrogen atmosphere at a temperature of 1,000° to 1,900°C. for about 6 to 10 hours, and
  f. recovering the mixed nitride nuclear fuel product.

7. The process according to claim 6 wherein the impregnated particles contain about 1 to 30 percent fissionable materials.

8. The process according to claim 6 wherein the particles are calcined in each of the calcination steps for a period of about 24 hours.

9. The process according to claim 5 wherein the urania 238 particles are heated in hydrogen or other reducing atmosphere at a temperature of about 400°–700°C. for a period of 0.5 to 3 hours.

10. The process according to claim 6 wherein the urania 238 particles are heated in hydrogen or other reducing atmosphere at a temperature of about 400°–700°C. for a period of 0.5 to 3 hours.

* * * * *